United States Patent
Hartig et al.

(10) Patent No.: US 9,009,105 B2
(45) Date of Patent: Apr. 14, 2015

(54) APPLICATION EXITS FOR CONSISTENT TENANT LIFECYCLE MANAGEMENT PROCEDURES

(75) Inventors: Martin Hartig, Speyer (DE); Peter Eberlein, Malsch (DE); Holger Neu, Heppenheim (DE); Hai Anh Pham, Karlsruhe (DE)

(73) Assignee: SAP SE, Walldorf (DE)

( * ) Notice: Subject to any disclaimer, the term of this patent is extended or adjusted under 35 U.S.C. 154(b) by 1082 days.

(21) Appl. No.: 12/982,610

(22) Filed: Dec. 30, 2010

(65) Prior Publication Data

US 2012/0173483 A1 Jul. 5, 2012

(51) Int. Cl.
*G06F 17/00* (2006.01)
*G06F 7/00* (2006.01)
*G06F 9/48* (2006.01)

(52) U.S. Cl.
CPC ........ *G06F 9/4856* (2013.01); *G06F 2209/482* (2013.01)

(58) Field of Classification Search
CPC ................... G06F 17/30598; G06F 17/30705; G06F 17/30575; G06F 17/3028; G06F 2201/84; G06F 11/1435; G06F 17/30212
USPC .......................................................... 398/82
See application file for complete search history.

(56) References Cited

U.S. PATENT DOCUMENTS

| | | | |
|---|---|---|---|
| 2011/0161952 A1* | 6/2011 | Poddar et al. | 717/173 |
| 2011/0271278 A1* | 11/2011 | Dittrich | 718/1 |
| 2011/0318011 A1* | 12/2011 | Brassil | 398/82 |
| 2012/0030514 A1* | 2/2012 | Lawrance et al. | 714/38.1 |
| 2012/0047139 A1* | 2/2012 | Fitzer et al. | 707/737 |
| 2012/0054720 A1* | 3/2012 | Klein et al. | 717/125 |
| 2012/0116849 A1* | 5/2012 | Thiele et al. | 705/7.37 |
| 2012/0159421 A1* | 6/2012 | Driesen | 717/101 |
| 2012/0173488 A1* | 7/2012 | Spielberg et al. | 707/639 |
| 2012/0174113 A1* | 7/2012 | Pohlmann | 718/104 |

* cited by examiner

*Primary Examiner* — Dung K Chau
(74) *Attorney, Agent, or Firm* — Mintz Levin Cohn Ferris Glovsky and Popeo, P.C.

(57) ABSTRACT

The subject matter described herein relates to software routines called application exits that are provided at well defined phases of a tenant copy process. The tenant copy process enables copying of separated tenant data associated with a source tenant at multi-computing tenant system to a new created tenant at a destination location either at multi-computing tenant computing system or second multi-computing tenant computing system. The application exits perform predefined functions at the well defined phases such that the predefined functions enable operations including detachment of tenant data from the source tenant that needs to be copied or moved such that the detached tenant data is separated tenant data. When the source tenant is just being moved, instead of being copied, from a source location to a destination location, the source tenant is deleted once all the data associated with the source tenant has been moved to the destination location.

14 Claims, 8 Drawing Sheets

FIG. 7

APPLICATION EXITS FOR CONSISTENT TENANT LIFECYCLE MANAGEMENT PROCEDURES

TECHNICAL FIELD

The subject matter described herein relates to application exits at well-defined phases of a tenant copy procedure in a multi-tenant computing landscape.

BACKGROUND

In a multi-tenancy landscape, multiple tenants share a same runtime of a single multi-tenant computing system. FIG. 1 illustrates a multi-tenancy landscape 100. In a multi-tenancy landscape 100, a single instance of a software application running on a multi-tenant computing system ("multi-tenant computing system 1 (118)") serves multiple tenants. An example of the software application is "Business ByDesign (ByD)" by SAP. The multi-tenant computing system may refer to a server hosting the software application. The tenants refer to systems at one of client organizations that access the software application and individual clients that access the software application. The tenants of the multi-tenancy landscape 100 share the same application. In the multi-tenancy landscape 100, each tenant works with a customized virtual application instance. Further, the multi-tenancy landscape 100 comprises other one or more multi-tenant computing systems (e.g. "multi-tenant computing system 2 (120)"), where each of the other one or more multi-tenant computing systems is capable of serving one or more tenants.

Often, there is a need to copy or move a tenant from multi-computing tenant computing system 118 to either a new location in multi-computing tenant computing system 100 or multi-computing tenant computing system 120. The noted copying or movement of a tenant requires complete copying or movement of tenant data associated with the tenant. Tenant data associated with all the tenants is stored in persistency levels including TREX, MaxDB LiveCache and Database.

For the copying or movement of tenant data associated with a tenant that needs to be moved, there exists a problem that the tenant data is not clearly separate from data associated with other tenants. For example, there exists client-independent data besides client-dependent data. For example, when different tenants register at a multi-tenant computing system to perform a function (e.g. receive some kind of incoming calls), the registry-entries of the different tenants are not clearly separable from each other. Further, since separation of tenant data is not known, copying or movement of client-independent data is also not conventionally known.

If the tenant data associated with each tenant of the multi-computing tenant system 118 is clearly separable from data associated with other tenants of the multi-computing tenant system 118, the tenant can be copied/duplicated or moved efficiently using database or file operations. Accordingly, there exists a need to copy clearly separated tenant data associated with a tenant that needs to be copied or moved from a first multi-computing tenant computing system to either a new location in the first multi-computing tenant computing system or a second multi-computing tenant computing system.

SUMMARY

The subject matter described herein relates to software routines called "application exits" that are executed in a multi-tenancy computing platform and which are provided at well defined phases of a tenant copy process. The tenant copy process enables copying of separated tenant data associated with a source tenant at multi-computing tenant system to a new created tenant at a destination location either at multi-computing tenant computing system or second multi-computing tenant computing system. The application exits perform predefined functions at the well defined phases such that the predefined functions enable operations including detachment of tenant data from the source tenant that needs to be copied or moved such that the detached tenant data is separated tenant data. When the source tenant is just being moved, instead of being copied, from a source location to a destination location, the source tenant is deleted once all the data associated with the source tenant has been moved to the destination location.

In one aspect, a computer-implemented method includes executing an application in a first runtime environment of the multi-tenant computing system for at least one tenant, the application using tenant content associated with the at least one tenant. The method further includes copying the at least one tenant to a second runtime environment of the multi-tenant computing system according to a tenant copy procedure, and defining a set of application exits for the tenant copy procedure, the set of application exits enabling detachment of the at least one tenant from the application during the copying.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, application exits allow not only client-dependent data but also client-independent data to be copied or moved in a multi-tenancy landscape from a source tenant at multi-tenant computing system to a newly created target tenant at either multi-tenant computing system or multi-tenant computing system. Moreover, the execution of application exits at predefined phases enable the copying process, which includes tenant export and tenant import, to be more well defined and consistent as the application exits are executed consistently i.e. executed at well defined phases.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 illustrates an exemplary implementation of method IF_TLM_OPERATION~EXPORT_CLIENTIND_DATA of class CL_TLM_CCEXIT_SAMPLE—putting data into the data container.

When practical, similar reference numbers denote similar structures, features, or elements.

DETAILED DESCRIPTION

Figure 1:
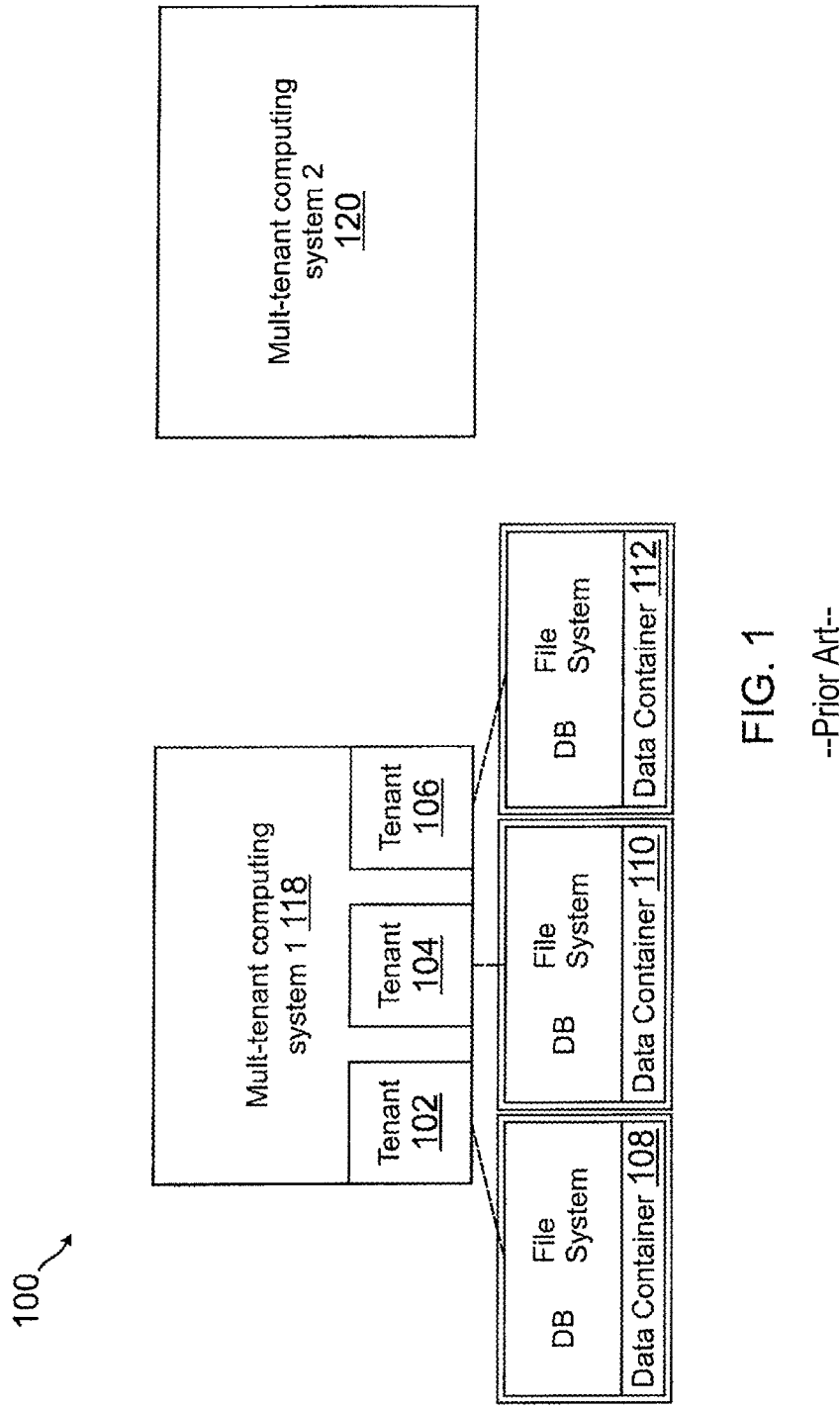
FIG. 1 illustrates a multi-tenancy environment.

As shown in FIG. 1, one or more implementations of the current subject matter provide methods, systems, articles or manufacture, and the like that can, among other possible advantages, provide application exits at well defined phases in the copy procedure to copy in a well defined consistent manner a tenant from multi-tenant computing system 118 to another location in either multi-tenant computing system 118 or multi-tenant computing system 120. The provision of application exits allows clearly separated tenant data to be copied from a source tenant at one multi-tenant computing system to a target tenant at either the one multi-tenant computing system or another multi-tenant computing system.

In the description that follows, tenant data and persistencies in which the tenant data is stored are described. Further, a tenant copy environment is described, where the tenant copy environment includes a tenant export process and a tenant import process. The tenant export process and the tenant import process take place in different phases, which will be described later. Further, different types of processes or scenarios in the tenant copy process are explained. Then the application exits that are implemented in predetermined phases of the tenant export process and the tenant import process are described. The predetermined phases and corresponding application exits are listed as follows: before deletion of a tenant (Application Exit: BEFORE_TENANT_DELETION), after creation of an empty tenant (Application Exit: AFTER_TENANT_CREATION), before export of a tenant (Application Exit: EXPORT_CLIENTIND_DATA), after physical copy of a tenant (Application Exit: IMPORT_CLIENTIND_DATA), and after complete copy procedure (Application Exit: AFTER_TENANT_COPY). The noted application exits at these predetermined phases are described later in the specificaiton. The description of application exits includes the interfaces implemented. Next, the parameters of the application exits are explained. One of the parameters is specific to a data container that allows a copy of tenant-independent data that is not copied by conventional copy methods, which copy only tenant-dependent data.

The data associated with a tenant is also termed as tenant data or tenant application data. Specifically, the tenant data refers to data of a particular tenant that is associated with an application (e.g. Business ByDesign (ByD)). For ByD, tenant application data is associated with the following persistencies: TREX, MaxDB Live Cache, and Database.

Figure 2:
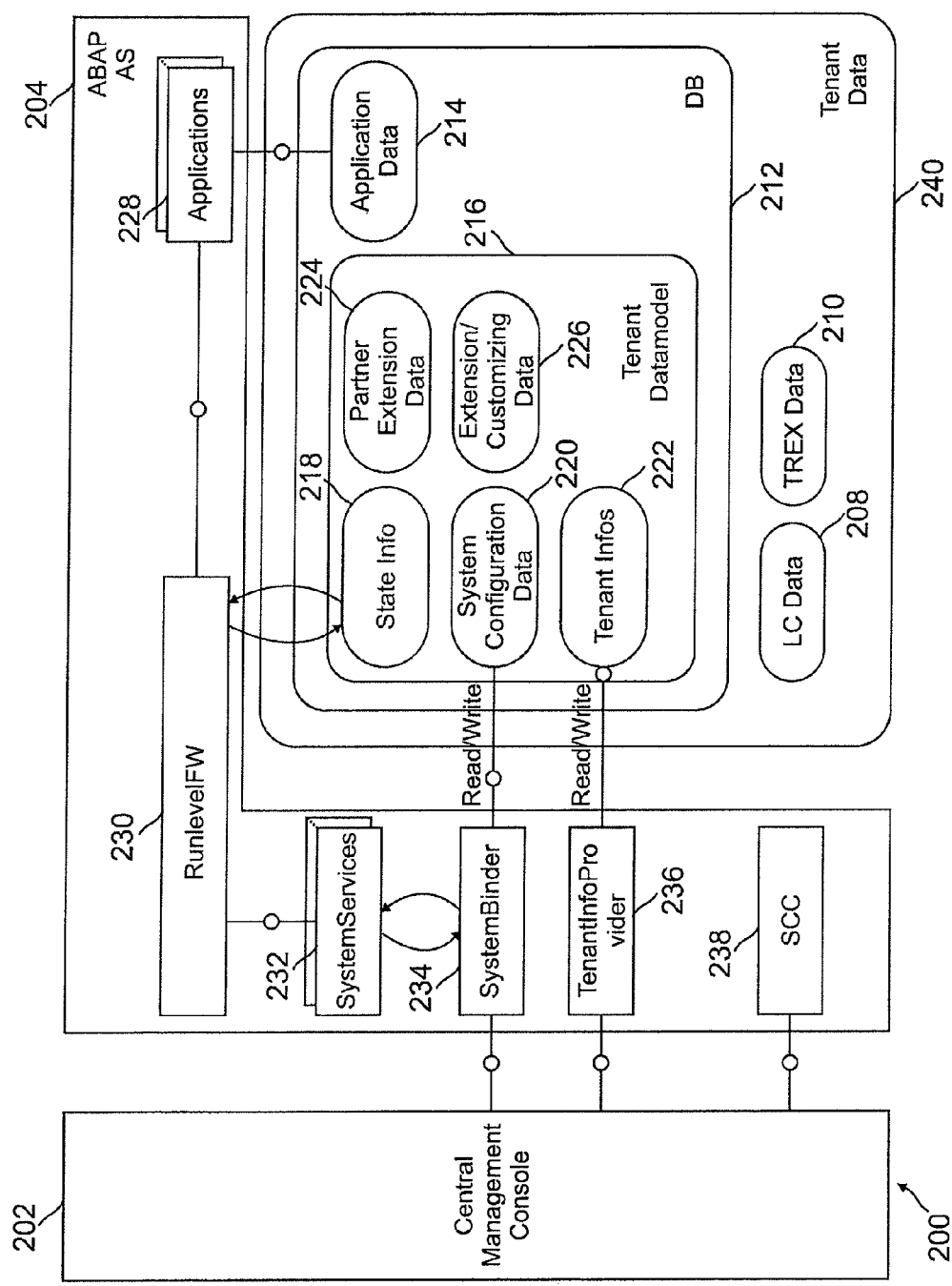
FIG. 2 illustrates an overview of tenant data.

FIG. 2 illustrates an overview of tenant data in a multi-tenant computing system 200. Tenant data 240 is included in persistencies including the database (MaxDB), the MaxDB Live Cache, and the TREX. The data in the LiveCache is called LiveCache Data 208, and the data in the TREX is called TREX Data. Database 212 comprises application data 214, and tenant datamodel 216. Tenant data model 216 comprises state information 218, system configuration data 220, tenant information 222, extension data of partners or partner extension data 224, and extension/customizing data 226. Application server 204 comprises applications 228, run-level FW, 230, system services 232, system binder 234, tenant information provider 236 and SCC 238. Application data 214 is the data associated with applications 228. The run-level FW is associated with state information 218. The system binder has a read access and a write access of system configuration data 220. The tenant information provider has a read access and a write access of tenant information 222.

To achieve an automated copying or moving of a tenant, separation of tenant application data for all the tenants needs to be ensured.

The database 212 stores tenant data in database tables that are distributed among several database files. Tenant data within a database table is separated from tenant data associated with other tenants by a tenant attribute.

The Live Cache offers an Application Programming Interface (API) to download and upload tenant data of tenants into the database table. In preferred implementations, the database 212 supports this logical data separation.

A search engine such as TREX is used for indexing data of business objects (e.g. tenants) to retrieve a faster data access. Data of a primary business object is stored within the database. The search engine and the database persistencies are synchronized. When tenants are moved or copied, the corresponding indices of the tenants are moved or indicated too. The indexing of the tenants allows the search engine to store tenant data for different tenants in separate independent files. Furthermore, the search engine offers a duplication API of tenant indices.

Lifecycle information about a tenant is stored within the tenant data model (TDM) 216, business landscape directory (BLD), and a service provider cockpit (SPC) (not shown). The TDM 216 stores all information about a tenant at a central place within a tenant. The information about the tenant includes a history of the tenant, add-ons of the tenant, state of the tenant, and namespaces of the tenant. The SPC can trigger an import of a tenant on a multi-tenant computing system, or an export on a multi-tenant computing system, as will be described later.

Figure 3:
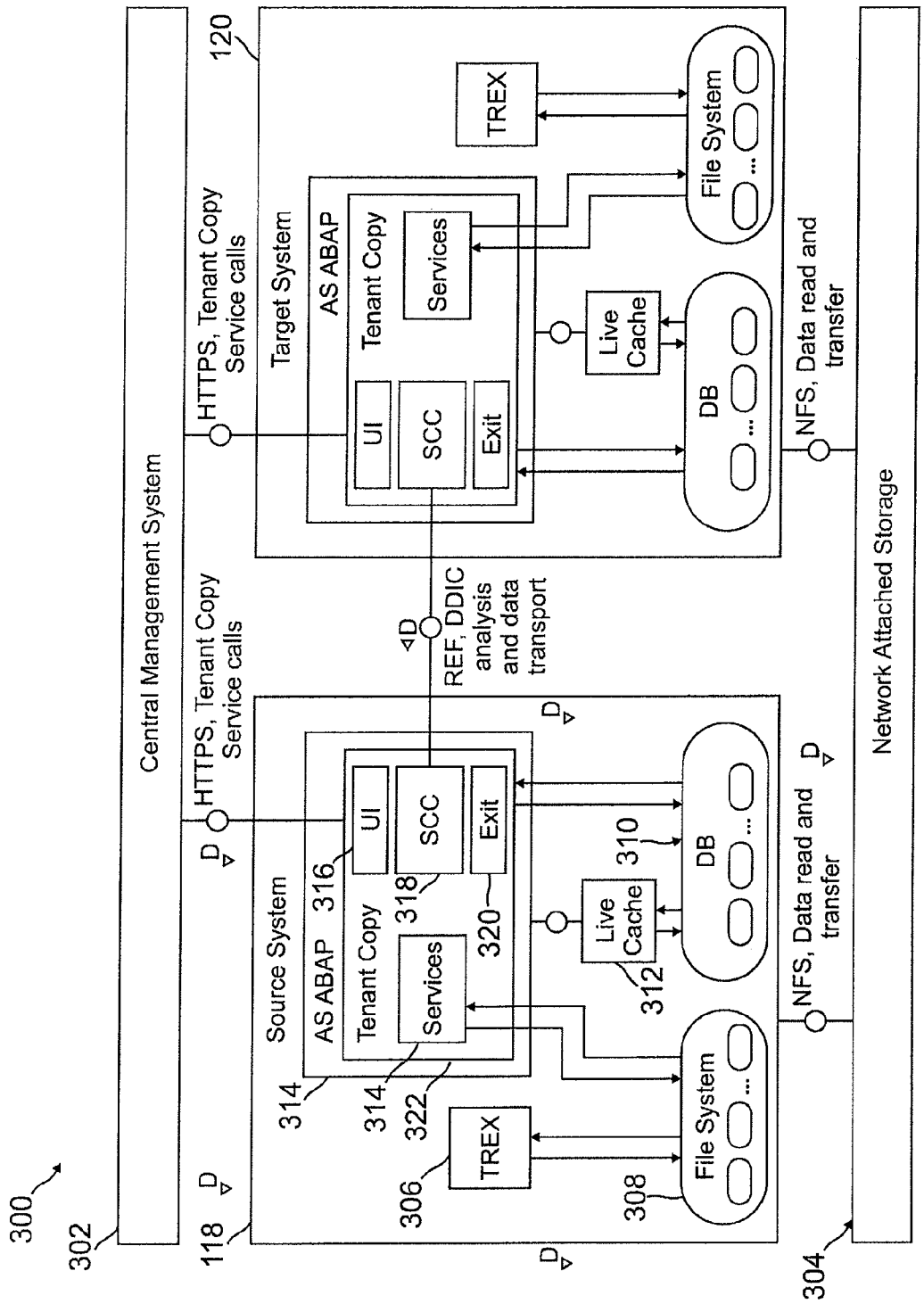
FIG. 3 illustrates architecture of a tenant copy environment.

FIG. 3 illustrates an architecture of a tenant copy environment in multi-tenant computing landscape 300. The tenant copy environment in the multi-tenant computing landscape 300 includes central management system 302, source multi-tenant computing system 118, target multi-tenant computing system 120, and network attached storage 304. Source multi-tenant computing system 118 includes the following persistence layers: application server 314, search engine 306 (i.e. "TREX"), file system 308, database 310, and a cache 312 (i.e. "LiveCache"). Application server 314 comprises a tenant copy 322 that includes services 314, user interface 316, SCC 318, and exit 320. Similar to source multi-tenant computing system 118, target multi-tenant computing system 120 has an application server, search engine, cache, database and file system.

The tenant copy process is divided into a tenant export process and a tenant import process. The tenant export process occurs in the following phases: Preparation, Preprocessing, Export and Cleanup. The tenant import process occurs in the following phases: Preparation, Import, Postprocessing, Technical Configuration and finally Cleanup. The tenant export process and the tenant import process are described as follows.

Tenant Export Process

Figure 4:
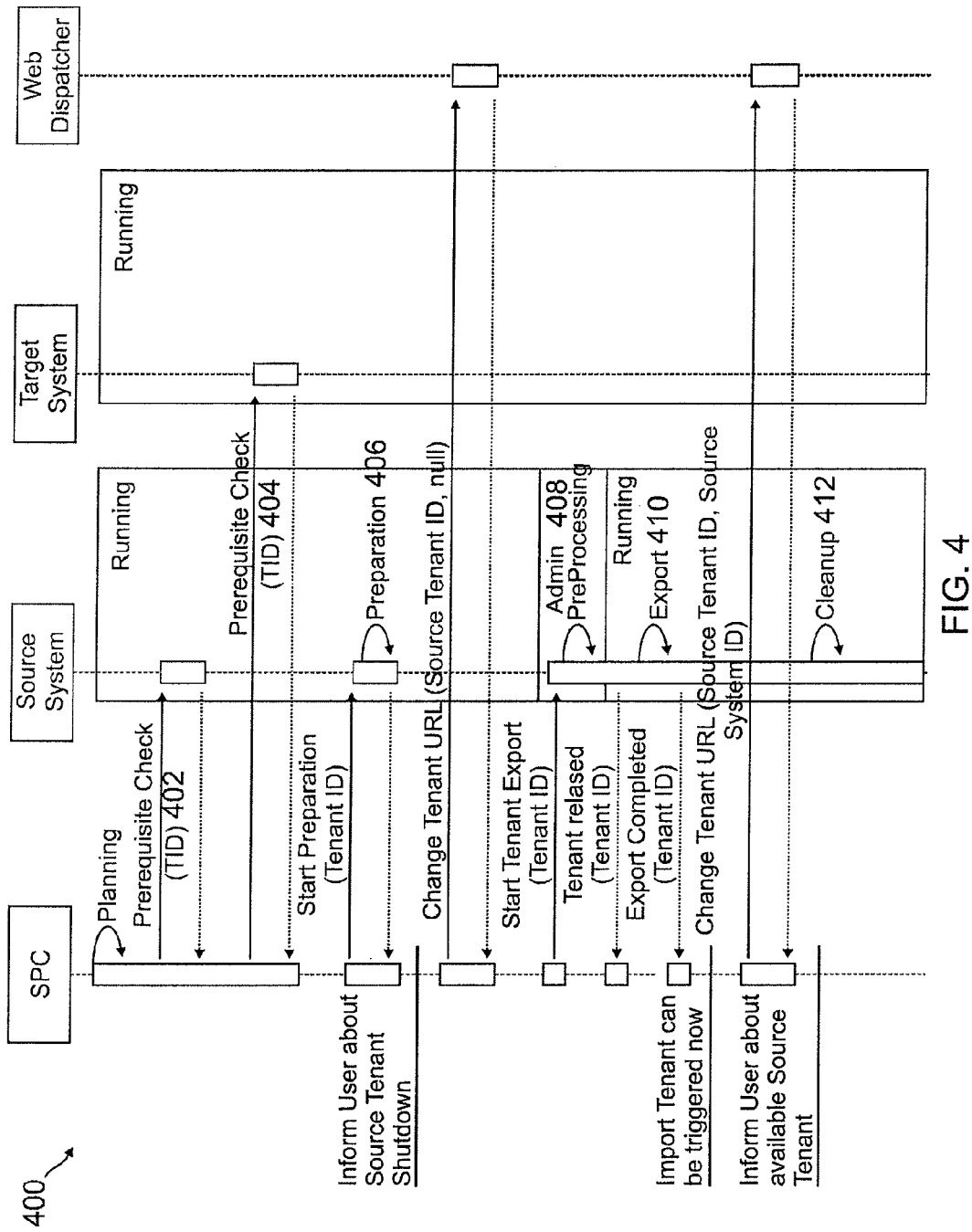
FIG. 4 illustrates a tenant export process triggered by service provider cockpit (SPC)

FIG. 4 illustrates a tenant export process 400 triggered by service provider cockpit (SPC). The tenant import process occurs in the following phases that cover actions which take place on source multi-tenant computing system 118.

Prerequisite Check: The prerequisite check is performed for both source multi-tenant computing system 118 and target multi-tenant computing system 120. The prerequisite check for source multi-tenant computing system 118 is denoted by 402, and the prerequisite check for target multi-tenant computing system 120 is denoted by 404. This phase on source multi-tenant computing system 118 is intended to calculate the source tenant size and to do further checks that must be performed to ensure that the export of a tenant can be started.

Preparation 406: In this phase, all activities that can be performed before stopping the system are executed upfront. The upfront execution of the activities decreases a customer's downtime, during tenant move, of source multi-tenant computing system 118.

Preprocessing 408: When the tenant copy process is finally triggered, this phase is executed first. At the beginning, the tenant is still running. But, before selecting and transferring tenant data of the tenant, it is ensured that the data is in a consistent state. To reach a consistent data view, the tenant data stored in volatile storages is flushed into a non-volatile storage with the capability to access the tenant data regarding its relations. Thus, the tenant is idled, the creation of new threads or processes triggered by the customers is restricted and all sessions are closed. On the other hand, coding is still executable. This state is called Admin mode or Admin state.

It is to be noted that data of tenants is stored separately, according to a client separation guideline, for each client in client dependent tables in the persistencies. However, some components do not follow the client separation guideline, and data for those components is not separated from each other. The non-separated data is stored in client independent tables. When the tenant reaches the Admin state, actions to collect data from client independent tables and to store the collected data in client dependent tables are started.

Afterwards, the tenant is started (i.e. switched to state running) and released again to a customer.

Export 410: In this phase the data of a tenant is selected and directly transferred into target multi-tenant computing system 120 or even exported as an intermediate result that is later imported by target multi-tenant computing system 120. Both approaches do not affect usage of the overall tenant copy application. It is to be noted that the source tenant export is type (or scenario) independent. In other words, the export tenant is a 1:1 copy of the source tenant regardless of later usage of the source tenant and/or the exported tenant.

Clean-up 412: All temporary preparations that are necessary for the export, but are not a part of the final export result, are removed from source multi-tenant computing system 118 once the copy has finished. Such temporary preparations include the database snapshot and the temporary database.

Tenant Import Process

Figure 5:
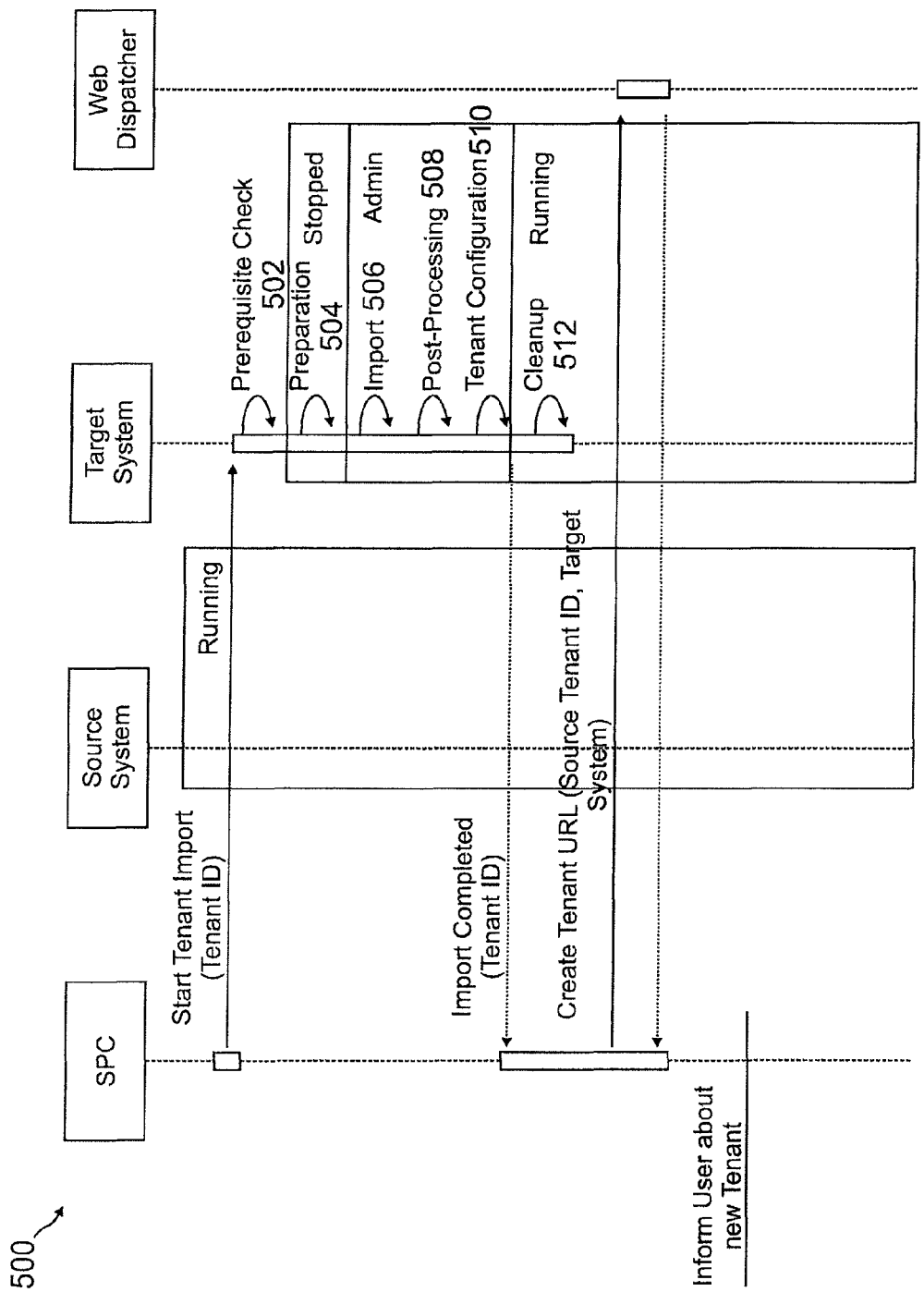
FIG. 5 illustrates a tenant import process triggered by service provider cockpit (SPC)

FIG. 5 illustrates a tenant import process 500 triggered by service provider cockpit (SPC). The tenant import process occurs in the following phases that cover actions which take place on source multi-tenant computing system 118.

Prerequisite Check 502: This phase on target multi-tenant computing system 120 is intended to calculate a free system size and to perform further checks, possibly retrieving the currently installed add-ons.

Preparation 504: The tenant is in a "stopped" state. Everything that is needed on target multi-tenant computing system 120 to start the data import is executed in this phase.

Import 506: Before importing the tenant data, the tenant is started in Admin mode. This is required to execute reports within the tenant but to avoid the processing of any imported tenant data. Then, the tenant is imported.

Postprocessing 508: After all original tenant data is in place on target multi-tenant computing system 120, the components that stored their client independent data into client dependent tables start the reverse operation. Another task performed during this phase is the regeneration of objects described through meta data.

Tenant Configuration 510: Now the target tenant is technically equivalent (except for the business configuration which will be done in the previous phase) to the source tenant. Therefore, typification must be done through the technical configuration.

At the end of this phase, the tenant is set to a running state and is released to the customer.

Cleanup 512: All redundant data used for the data transfer is removed in this phase.

The tenant copy/move process comprises different use cases known as scenario types. A scenario type indicates a type of process. Accordingly, a scenario type is also known as a process type. The following are different scenario types for a tenant copy process:

Initial Master Setup (A2M),
Master to Stock Tenant (M2S),
Master Tenant to Productive Tenant (M2P),
Stock Tenant to Productive Tenant (S2P),
Productive Tenant to Test Tenant (P2T),
Productive Tenant to Recovery Tenant (P2R) and
Tenant Move Besides being applicable in copying of a tenant, the P2T scenario is applicable in at least one of a development, migration, and update or upgrade of a tenant. Tenant move is a scenario type when all tenants on source multi-tenant computing system 118 are being copied/moved to target multi-tenant computing system 120.

Using the above-noted tenant export process and the tenant import process, the Tenant Life-cycle Management (TLM) copies or even moves a complete tenant within a multi-tenant computing system or cross systems (i.e. from a first multi-tenant computing system to a second multi-tenant computing system). The TLM is based on separation, according to a content separation guideline, of data within a database of one tenant from data within the database of other tenants, wherein the database stores separate tenant related information in client-dependent tables. However, some components may not be able to stick to the content separation guideline, and thus the data represented by those components is not separately stored in the client-dependent tables. Accordingly, there needs to be a different guideline or a way to separate the data that is not separately stored in client-dependent tables, and is stored in a client independent way (e.g. in client independent tables). Additionally, there is a further need to have a possibility of triggering components before and after the TLM process to do pre-tasks or post-tasks.

For separation of tenant application data stored in client-independent tables, programming code routines called application exits are provided. The application exit (software routine) lies outside the copy tool and is called by the copy tool during predefined phases of a tenant copy process. When a client is copied, the copy tool only considers client-dependent tables. The copy tool does not care about client-specific information stored in a client-independent way. Also, the copy tool does not care about adjusting data (e.g. system ID) after a copy. Accordingly, if a copy of client-dependent data is not sufficient to run an application on a copied tenant, one or more Application Exits have to be implemented to perform all specific things to make the application run again.

Additionally, the copy tool provides functionalities to delete a client (e.g. to support client move consisting of copy and deletion). During deletion of a client, the copy tool only cares about data which is stored in client-dependent tables. To be able to reuse a deleted client, it is important that all client-specific data is deleted. So, if an application stores client-specific data in a client-independent way, the application must also implement an application exit to make sure, that this data gets deleted correctly.

Application exits are code routines written for Tenant Lifecycle Management (TLM) operations and for System Lifecycle Managament operations. The application exits implement two interfaces viz. IF_LM_OPERATION and IF_TLM_OPERATION. The implemented interfaces contain methods, which will be clearer later. Each method represents one application exit.

IF_LM_OPERATION is used to implement application exits for System Lifecycle Management. The IF_LM_OPERATION contains methods to perform a cleanup before and after a copy. These methods are implemented if there is data that can be deleted before or after a copy. The methods are implemented without using CLIENT SPECIFIED, since the coding is executed in all relevant clients. By default, Open SQL statements use automatic tenant handling. Statements that access client-dependent application tables only use the content from a current client. However, to use content from another client, other than the current client, the another client needs to be specified using CLIENT SPECIFIED.

IF_TLM_OPERATION is used to implement application exits for Tenant Lifecycle Management. The IF_TLM_OPERATION includes methods contained in the IF_LM_OPERATION and additional methods relevant for only Tenant Lifecycle Management. For example, if an application has client-specific data stored in a client-independent way, it has to make its data temporarily client-dependent. This is only required for tenant copy. If a whole multi-tenant computing system is copied, this is not necessary since all data will be copied.

So, for implementation of application exits, the interface (IF_LM_OPERATION or IF_TLM_OPERATION) that needs to be used is decided first. Then, an ABAP object oriented class is created, wherein the object oriented class implements the decided interface.

Registration, as will be discussed below, of all the application exits is done by an entry within a "CCCEXIT" table, originally used for Client Copy transactions. A change to Client Copy logic regarding registration of the application exit can influence Tenant Copy application exits.

The Tenant Copy or Move process takes only care for the data stored in client-dependent tables. Thus, whenever a component stores tenant data (and multi-tenant computing system configuration data) stored outside client-dependent tables, an application exit needs to be implemented. Furthermore, if a component generates objects, based on one of metadata, customer specific configuration, namespaces etc., after a Tenant Copy/Move process, application exits need to be implemented. Moreover, for substitution of multi-tenant computing system related information or tenant related information, an application exit needs to be implemented.

In the following description, the methods of IF_LM_OPERATION and IF_TLM_OPERATION are described.

Actions Relevant to Tenant Copy and System Copy

In case of a tenant copy or a multi-tenant computing system copy, the methods described below offer a possible implementation of application exits within specific tenant copy/multi-tenant computing system copy phases for each method. The corresponding phase for each method is noted below as well. The methods (CLEANUP_BEFORE_COPY and CLEANUP_AFTER_COPY) described below are implemented by using the Interface IF_LM_OPERATION. Note that parameters associated with the methods described below are explained after a description of all methods.

CLEANUP_BEFORE_COPY

Before tenant data of a tenant is exported, the method CLEANUP_BEFORE_COPY removes unnecessary items that are not be exported but are stored within client-dependent tables.

This method is executed by the copy tool in the source tenant/client. Before implementing this method, it needs to be ensured that the data that is to be removed is needed neither in the source tenant nor in the target tenant.

The corresponding Tenant Copy phase is: PREPROCESSING in source multi-tenant computing system 118.

The parameters used in CLEANUP_BEFORE_COPY are noted in the table below.

TABLE 1

| Parameter | Type | Typing Method | Associated Type |
|---|---|---|---|
| IR_LOGGER | Importing | Type Ref to | IF_TLM_LOG |
| IV_WP_MAX | Importing | Type | TLM_WP_MAX |
| RV_RETURNCODE | Returning | Type | SYSUBRC |

CLEANUP_AFTER_COPY

After the tenant data is completely copied and available within target multi-tenant computing system 120 and the tenant is released to the customer, the data created as intermediate results or redundant data that is not required anymore is removed/cleaned-up.

This method is executed by the copy tool in the target tenant/client. Before implementing this method, it needs to be ensured that the data that is to be removed is needed neither in the source tenant nor in the target tenant.

The corresponding Tenant Copy phase is: CLEANUP in target multi-tenant computing system 120.

The parameters used in CLEANUP_AFTER_COPY are noted in the table below.

TABLE 2

| Parameter | Type | Typing Method | Associated Type |
| --- | --- | --- | --- |
| IR_LOGGER | Importing | Type Ref to | IF_TLM_LOG |
| IV_WP_MAX | Importing | Type | TLM_WP_MAX |
| RV_RETURNCODE | Returning | Type | SYSUBRC |

Actions Relevant to Only Tenant Copy

In case of a Tenant Copy, the methods described below offer a possible implementation of application exits within specific Tenant Copy phases for each method. The corresponding phase when the application exit is implemented is mentioned below for each method. The methods (AFTER_TENANT_CREATION, BEFORE_TENANT_DELETION, EXPORT_CLIENTIND_DATA, IMPORT_CLIENTIND_DATA, and AFTER_TENANT_COPY) described below are implemented by using the Interface IF_TLM_OPERATION. Note that parameters associated with the methods described below are explained after a description of all methods.

AFTER_TENANT_CREATION

The method AFTER_TENANT_CREATION performs actions required after a new tenant is created. However, during a copy procedure, this method is not called.

This method is executed by the copy tool in the newly created tenant/client.

The parameters used in AFTER_TENANT_CREATION are noted in the table below.

TABLE 3

| Parameter | Type | Typing Method | Associated Type |
| --- | --- | --- | --- |
| IR_LOGGER | Importing | Type Ref to | IF_TLM_LOG |
| IV_WP_MAX | Importing | Type | TLM_WP_MAX |
| RV_RETURNCODE | Returning | Type | SYSUBRC |

BEFORE_TENANT_DELETION

Before a tenant is deleted, this method is called. In case a client has stored some additional data, generated data after a tenant copy or tenant creation, or established system service items required to run a tenant, the noted data and items are deleted using the method BEFORE_TENANT_DELETION.

This method is executed by the copy tool in a tenant/client that is to be deleted.

The parameters used in BEFORE_TENANT_DELETION are noted in the table below.

TABLE 4

| Parameter | Type | Typing Method | Associated Type |
| --- | --- | --- | --- |
| IR_LOGGER | Importing | Type Ref to | IF_TLM_LOG |
| IV_WP_MAX | Importing | Type | TLM_WP_MAX |
| RV_RETURNCODE | Returning | Type | SYSUBRC |

EXPORT_CLIENTIND_DATA

The method EXPORT_CLIENTIND_DATA is called before the tenant data is exported. Conventionally, the exported tenant data is the data stored in client dependent tables. In case the tenant data is not stored in client-dependent tables, it is possible to store this tenant data in a DATA CONTAINER. The method EXPORT_CLIENTIND_DATA ensures that the DATA CONTAINER is exported along with the export of data stored in client dependent tables. The method EXPORT_CLIENTIND_DATA further ensures that all multi-tenant computing system related information (required to run a tenant in source multi-tenant computing system 118) that belongs to the tenant is copied too. Furthermore, tenant related configuration data that is used to configure the tenant in source multi-tenant computing system 118 is copied as well.

This method is executed by the copy tool in the source tenant/client.

This method is called within Tenant Copy phase: PREPROCESSING in source tenant. It is to be noted that the Tenant Copy phase and the Tenant Copy Export phase are not the same.

The parameters used in EXPORT_CLIENTIND_DATA are noted in the table below.

TABLE 5

| Parameter | Type | Typing Method | Associated Type | REMARK |
| --- | --- | --- | --- | --- |
| IR_LOGGER | Importing | Type Ref to | IF_TLM_LOG | |
| IR_DATA_CONTAINER | Importing | Type Ref to | CL_TLM_DATA_CONTAINER | Tenant Data Container |
| IV_WP_MAX | Importing | Type | TLM_WP_MAX | |
| RV_RETURNCODE | Returning | Type | SYSUBRC | |

IMPORT_CLIENTIND_DATA

After the import of the tenant data is done, the previously packed data (except the configuration data of the tenant) in DATA CONTAINER, as noted with respect to the method EXPORT_CLIENTIND_DATA, is unpacked in this method.

This method is executed by the copy tool in the target tenant/client.

Compared to the EXPORT_CLIENTIND_DATA method, the IMPORT_CLIENTIND_DATA method uses an additional parameter PROCESS_TYPE. This additional parameter enables an implementation of a scenario dependent behavior. Furthermore, in this method, a substitution of multi-tenant computing system related information takes place.

The corresponding Tenant Copy phase is: POSTPROCESSING in target multi-tenant computing system. It is to be noted that the Tenant Copy phase is not the same as the Tenant Copy Import phase.

The parameters used in IMPORT_CLIENTIND_DATA are noted in the table below.

TABLE 6

| Parameter | Type | Typing Method | Associated Type | REMARK |
|---|---|---|---|---|
| IR_LOGGER | Importing | Type Ref to | IF_TLM_LOG | |
| IR_DATA_CONTAINER | Importing | Type Ref to | CL_TLM_DATA_CONTAINER | Tenant Data Container |
| IV_PROCESS_TYPE | Importing | Type | TLMPROCESSTYPE | Uniquely identifies use case (process type or scenario) |
| IV_WP_MAX | Importing | Type | TLM_WP_MAX | |
| IS_ADDTIONAL_PARAMETERS | Importing | Type | IF_TLM_OPERATION=>TY_ADDITIONAL_PARAMETERS | |
| RV_RETURNCODE | Returning | Type | SYSUBRC | |

AFTER_TENANT_COPY

The method AFTER_TENANT_COPY is used to perform all necessary data adjustment (e.g. replacement of system ID or tenant ID) after the client has been copied.

The parameters used in AFTER_TENANT_COPY are noted in the table below.

TABLE 7

| Parameter | Type | Typing Method | Associated Type | REMARK |
|---|---|---|---|---|
| IR_LOGGER | Importing | Type Ref to | IF_TLM_LOG | |
| IV_PROCESS_TYPE | Importing | Type | TLMPROCESSTYPE | Uniquely identifies use case (process type) |
| IV_WP_MAX | Importing | Type | TLM_WP_MAX | |
| IS_ADDTIONAL_PARAMETERS | Importing | Type | IF_TLM_OPERATION=>TY_ADDITIONAL_PARAMETERS | |
| RV_RETURNCODE | Returning | Type | SYSUBRC | |

Application Exit Interface Parameters

The following description explains the parameters associated with the above-noted methods.

Logging (IR_LOGGER)

IR_LOGGER is a reference to interface IF_TLM_LOG having one method ADD_MESSAGE. It is expected that a message, really existing in some message class, is passed. In this case one has to pass parameter IV_MSGID (name of message class), IV_MSGTY (message type), IV_MSGNO (message number) and IV_MSGV1 . . . IV_MSGV4 (message parameters). Other possibility is to supply some text in IV_MSGTEXT parameter. Messages posted by this method will appear in the detailed log of the Tenant LM.

Process Type (IV_PROCESS_TYPE)

IV_PROCESS_TYPE describes a use-case (process type or scenario) in which the application exit is executed.

For the usage of IV_PROCESS_TYPE an interface with constants is defined:
IF_TENANTLM_C=>PROCESS_LOCAL_TENANT_COPY—copy tenant within one multi-tenant computing system, e.g. Initial Master Tenant to Productive Tenant scenario type, IF_TENANTLM_C=>PROCESS_REMOTE_TENANT_COPY—copy tenant across multi-tenant computing systems, e.g. Productive Tenant to Test Tenant, i.e. P2T scenario type.

Since 1:1 copies are done, the application exits only need to know whether a copy is a LOCAL copy or a REMOTE copy.

When doing a remote copy, it can be assumed that the source multi-tenant computing system 118 and target multi-tenant computing system 120 have the same feature pack level, support pack level, and hot fix level. Further, all add-ons that were active for the source tenant in source multi-tenant computing system 118 shall be available on target multi-tenant computing system 120.

Data Container (IR_DATA_CONTAINER)

If a client application stores client-specific data in a client-independent way, the client-independent data needs to be made client-dependent so that the client-independent data can be copied by the copy tool. To obviate this problem of all data not being client-dependent data that can be copied and transferred as done conventionally, the copy tool provides a data container where the client data is stored. The advantage of having the data container is that database tables do not have to be created to store temporary data only for client copy. Each application exit can use the data container which will write all data into one database table. Using the data container is mandatory for all application exits that have to store temporary data.

If an application needs to convert data after copy from source to target client, it is expected that the application exit makes use of a data container provided by the client copy tool. The advantage is that an application does not create its own database tables to store temporary data only for client copy. But each application uses the same data container (e.g. a physical data base table).

The data container is implemented by class CL_TLM_DATA_CONTAINER. For each application exit, an instance to class CL_TLM_DATA_CONTAINER is created. The class name of the application exit is passed as actual parameter to the constructor. A Reference to the data container instance is passed as actual parameter to the methods IF_TLM_OPERATION~EXPORT_CLIENTIND_DATA and IF_TLM_OPERATION~IMPORT_CLIENTIND_DATA.

Within method IF_TLM_OPERATION~EXPORT_CLIENTIND_DATA the application exit has to convert their temporary data to type XSTRING (for example, by calling CALL TRANSFORMATION ID statement) and add it to the data container via method SET_DATA. Input parameter for method SET_DATA is the data string. The class name of the application exit is taken as part of the key for an entry of database table TENANT_DATA_CONT, which is the data container.

After the physical client copy within method IF_TLM_OPERATION~IMPORT_CLIENTIND_DATA the application exit has to pick their temporary data of type XSTRING from the data container via method GET_DATA. Output parameter of method GET_DATA is the data string. It can be converted back to the original data structures for example by calling CALL TRANSFORMATION ID statement.

After the client copy process is finished successfully all temporary data which was has been stored in the data container by the applications will be deleted by the client copy tool in a cleanup process.

Maximal Number of Work Processes

IV_WP_MAX parameter can be used to restrict number of processes running in parallel in an application exit in order not to overload the multi-tenant computing system.

Additional Parameters

IS_ADDTIONAL_PARAMETERS contains additional information which might be relevant to perform some data adjustment.

IS_ADDTIONAL_PARAMETERS-SOURCE_CLIENT—source client ID (MANDT)
IS_ADDTIONAL_PARAMETERS-SOURCE_SYSTEM—source system ID (SYSYSID)
IS_ADDITIONAL_PARAMETERS-SOURCE_HOST—short name of source message server (not filled during local copy)
IS_ADDITIONAL_PARAMETERS-SOURCE_FQN—full qualified name of source message server (not filled during local copy)
IS_ADDITIONAL_PARAMETERS-SOURCE_ADDR—source IP adress (not filled during local copy)

Return Code

Each application exit must return RV_RETURNCODE with the following possible values:
0—OK
1—something is not ok, but the process can continue (not critical)
2—critical error happened, process cannot continue In case RV_RETURNCODE=1 or 2, application exit writes some message(s) to the log.

The following constants are defined:
IF_TENANTLM_C=>RETURN_CODE_OK
IF_TENANTLM_C=>RETURN_CODE_WARNIING
IF_TENANTLM_C=>RETURN_CODE_ERROR Registration of an Application Exit Each implemented method is to be registered by inserting a corresponding entry into table CCCEXIT. This is done using view V_CCCEXIT.

The Methods can be in principle called at different phases, but there are certain phases created exactly for the execution of these application exits. Accordingly, the following phases are recommended to be used for registration:
MA: CLEANUP_AFTER_COPY
MB: CLEANUP_BEFORE_COPY
MC: AFTER_TENANT_CREATION
MD: BEFORE_TENANT_DELETION
ME: EXPORT_CLIENTIND_DATA
MI: IMPORT_CLIENTIND_DATA
MF: AFTER_TENANT_COPY Example of proper registration in CCCEXIT table:

TABLE 8

| CCPHASE | REPFBNAME | CCCOPYTYPE | CCPROGTYPE | CCPARID | CCPARVAL |
|---------|-----------|------------|------------|---------|----------|
| MD | CL_DELETE_ART | * | | MD | |

General Behavior of an Application Exit

The application exit takes into account that several life-cycle management processes (for example, 001–>100 and 002–>200) can run in the same multi-tenant computing system at one time. Any intersection (for example, 001–>100 and 001–>200, 001–>100 and 002–>100, 001–>100 and 100–>200, 001–>100 and 200–>001) is prohibited.

It is to be noted that while using application exits, it needs to be noted whether the application exit is being implemented at the source tenant or the target tenant. If the information on whether the implementation is on source tenant or target tenant is not included, the stored data can be overwritten by the same application exit running in another LM process.

Known Application Exits

TABLE 9 illustrates application exits for a particular exemplary implementation.

| AREA | NAME OF EXIT CLASS | EXECUTION PHASE | DESCRIPTION |
|---|---|---|---|
| LiveCache | /LCAP/CL_LC_TLM_HANDLER | Export data, Import data, Before deletion | Export data: download liveCache content to DB table<br>Import data: upload liveCache content from DB table<br>Before deletion: delete liveCache content |
| Output Management | /DOC/CL_T_UPDATE_EMAIL_LDAP | After copy, Before deletion | After copy: rebuild LDAP entries for MTA mail routing and adjust mail address<br>Before deletion: delete LDAP entries for MTA mail routing |
| MDRI (framework for MDROs) | CL_MDRI_CLIENT_COPY | Export data, Import data, Before deletion | Export data: pack all stopped batch jobs<br>Import data: unpack and reschedule copied batch jobs<br>Before deletion: delete all stopped/planned tenant specific jobs |
| Job Repository | CL_JOBD_TLM_HANDLER | After copy, Before deletion | After copy: schedule technical jobs from job repository depending on tenant + system settings<br>Before deletion: deactivate all scheduled technical background jobs |
| ICF | CL_ICF_TENANT_COPY | Export data, Import data | Export data: copy ICF data to data container and client independent secure store content to client-dependent part of secure store<br>Import data: import ICF data and secure store content<br>Note: Deletion of ICF data not covered by exit but separate step in TLM procedure |
| Web-Service Runtime | CL_SRT_TLM_HANDLER | After copy | Adapt logon client in the RFC service destination of WS Runtime |
| bgRFC | CL_BGRFC_TLM_HANDLER | Export data, Import data, After copy, Before deletion | Export data: store bgRFC units of source client in client-dependent table<br>Import data: restore bgRFC units in target client and adjust client and system ID<br>After copy: adjust client number in some bgRFC tables<br>Before deletion: delete bgRFC units |
| RFC | CL_AE_TENANT_COPY | After copy | Adjust logon client in all client-dependent RFC destinations |
| DMIS (Data Migration) | CL_DMC_TLM_HANDLER | After copy, Before deletion | After copy: delete copied table entries referencing generated runtime objects<br>Deletion: delete runtime objects which have been generated during data migration |

| AREA | NAME OF EXIT CLASS | EXECUTION PHASE | DESCRIPTION |
| --- | --- | --- | --- |
| Security | CL_STRUST_TLM_OPERATION | Export data, Import data, Before deletion | Export data: extract PSE files of source tenant and store in data container Import data: import PSE files from data container to target tenant Before deletion: delete PSE files from file system |
| Tenant Infrastructure | CL_SYSTEM_MESSAGE | Before deletion | Delete all client-specific System messages |
| Tenant LM | CL_TLM_DELETE_TABS_AFTER_COPY | After copy | Generic exit to delete client-dependent tables which are not needed in target tenant. Currently known: a) FDT_CC_0000 b) SDTSHD |
| FSI | CL_FSI_ADAPT_TENANT_COPY | Export data, Import data | Export data: export content of SFSG_REPL_META_H to data container Import data: convert meta keys of table SFGS_REPL_STATUS based on mapping data taken from data container (only relevant for remote copy) |
| CST | CL_UPDATE_TASK_TLM | Before deletion | Deletion of client specific update tasks which are still in queue |
| XRepository | CL_XREP_CORE_TLM_HANDLER | After copy | Regenerate UI loads (only relevant for remote copy) |
| Extensibility (incl. Analytics) | /EXT/CL_CUS_GEN_TLM_HANDLER | After copy, Before deletion | After copy: generate artifacts based on copied meta data and proper switches Before deletion: delete generation artifacts and switches |
| Oberon UI | CL_OBERON_RT_MD_CLIENT_CLEANUP | Before deletion | Deletion of mapping of client specific mapping of UI file-path to raw cache key of UI meta data |
| BC Tools | CL_BCTD_DPM_AFTER_TENANT_COPY | After copy | Adjust client and system info in table BCTD_DPM_INFO |
| Spool Log | CL_MDRI_SPOOL_LOG_CLEANUP | Before Deletion | Delete spool logs |
| Partner Development | CL_PDI_TLM_HANDLER | After copy, Before Deletion | After copy: create switches for partner add-ons Before deletion: delete/deactivate switches for partner add-ons |

Sample Implementation of an Application Exit

The class CL_TLM_CCEXIT_SAMPLE is a sample application exit class implementing the interface IF_TLM_OPERATION. It can be taken as an example for the applications which have to implement an exit.

Figure 6:
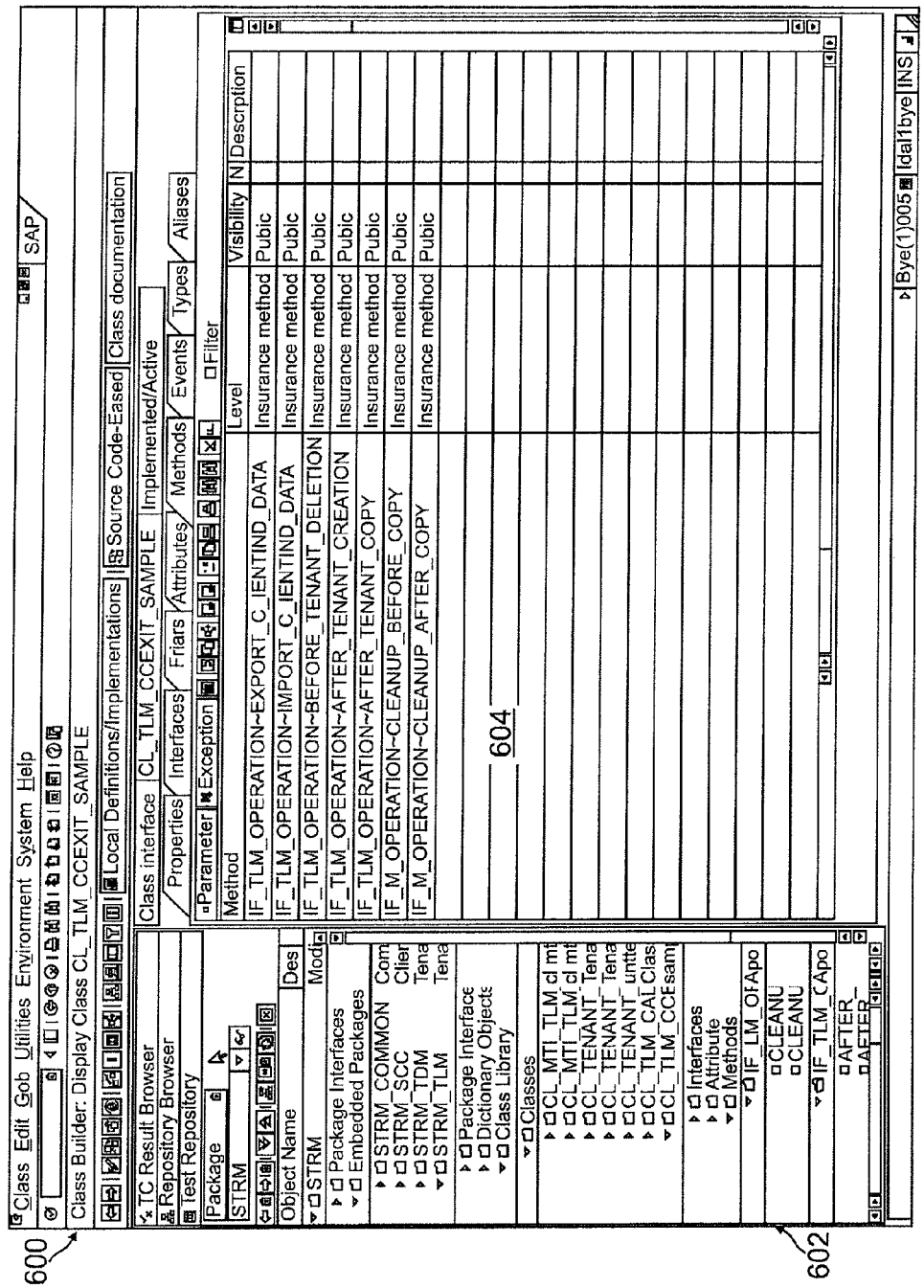
FIG. 6 illustrates an exemplary implementation of the CL_TLM_CCEXIT_SAMPLE class.

FIG. 6 illustrates an exemplary implementation of the CL_TLM_CCEXIT_SAMPLE class. User interface 600 includes area 602 and area 604. Area 602 allows a user to select methods of a particular class, and a list of the selected methods is displayed in area 604. Area 602 displays package interfaces and embedded packages. Each embedded package includes package interfaces, dictionary objects, and class library. The class library comprises of multiple classes. Each class comprises of interfaces, attributes and methods. The methods are displayed in area 604.

Figure 7:
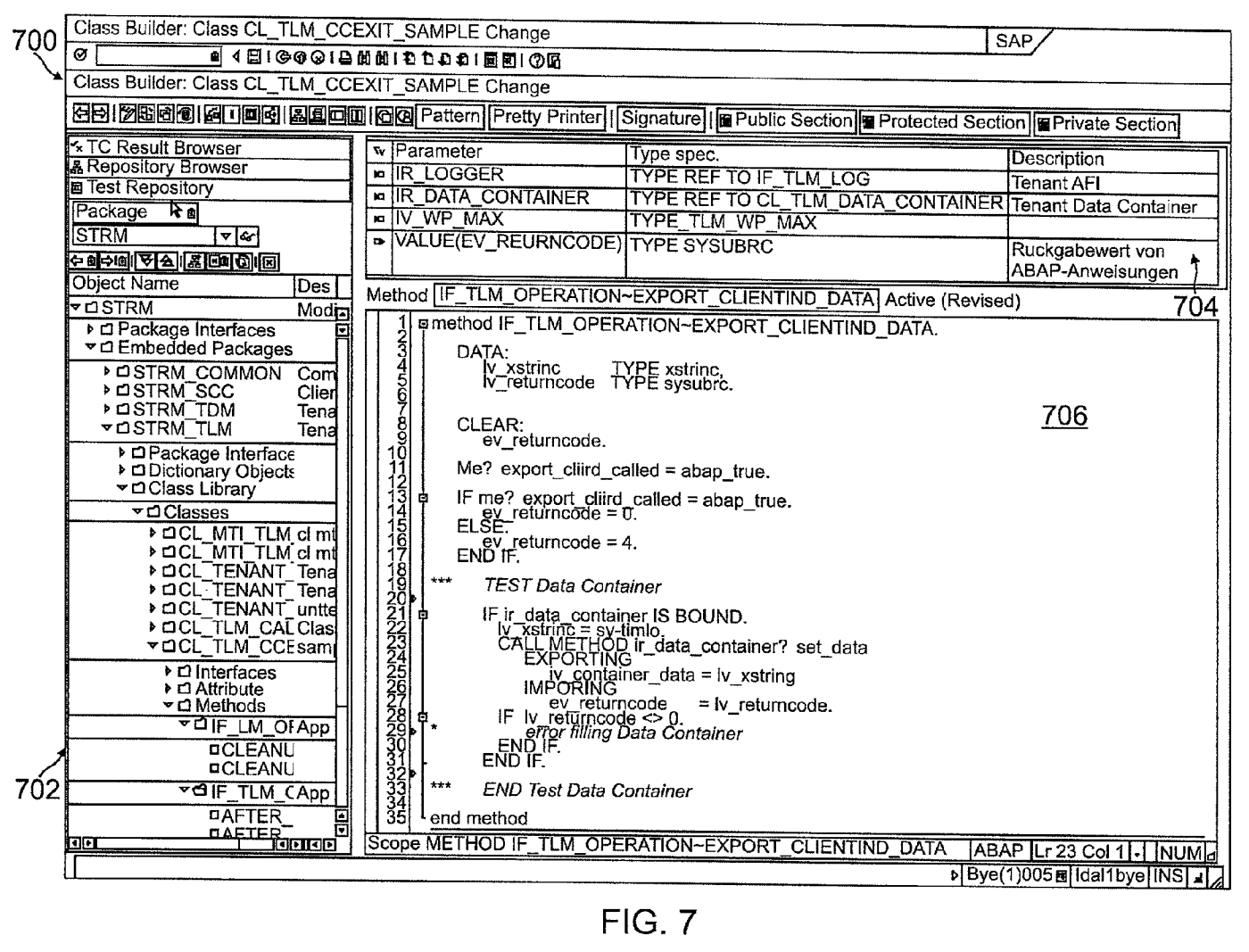

FIG. 7 illustrates an exemplary implementation of method IF_TLM_OPERATION~EXPORT_CLIENTIND_DATA of class CL_TLM_CCEXIT_SAMPLE. User interface 700 includes area 702, area 704 and area 706. Area 702 allows a user to select methods of a particular class. The parameters associated with the method are displayed in area 704, and a code for the method is displayed in area 706. Area 702 displays package interfaces and embedded packages. Each embedded package includes package interfaces, dictionary objects, and class library. The class library comprises of multiple classes. Each class comprises of interfaces, attributes and methods. Parameters corresponding to the methods are displayed in area 704. Code of the selected method IF_TLM_OPERATION~EXPORT_CLIENTIND_DATA is displayed in area 706.

The method IF_TLM_OPERATION~EXPORT_CLIENTIND_DATA packs data into the data container.

An implementation of the method IF_TLM_OPERATION~EXPORT_CLIENTIND_DATA is shown below:

```
IF ir_data_container IS BOUND.
    lv_xstring = sy-timlo.
    CALL METHOD ir_data_container->set_data
        EXPORTING
            iv_container_data = lv_xstring
        IMPORTING
            ev_returncode = lv_returncode.
    IF lv_returncode <> 0.
* error filling Data Container
* write some error message to log
        ev_returncode =
            IF_TENANTLM_C=>RETURNCODE_ERROR.
    ENDIF.
ENDIF.
```

Figure 8:
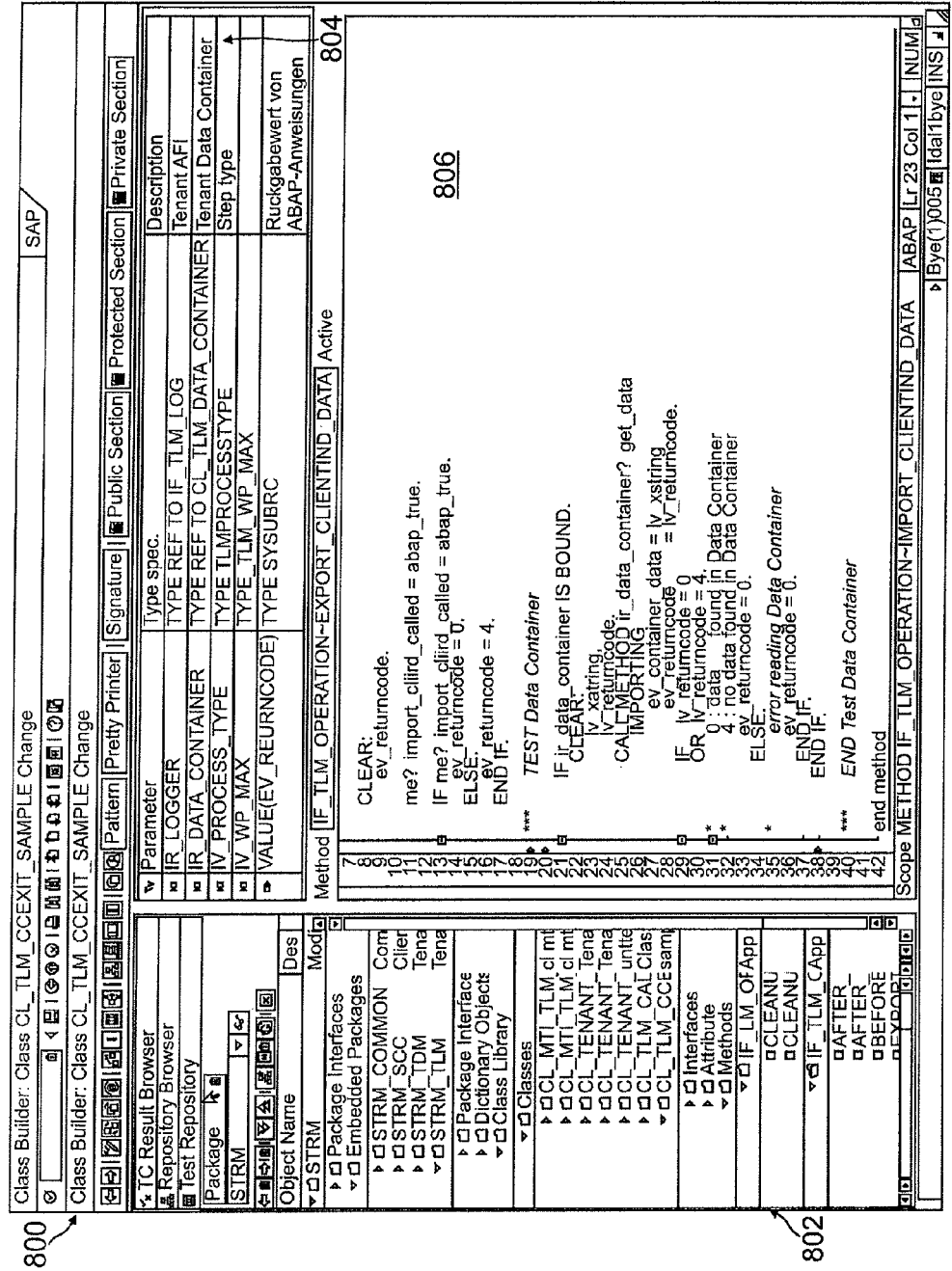
FIG. 8 illustrates an exemplary implementation of method IF_TLM_OPERATION~IMPORT_CLIENTIND_DATA of class CL_TLM_CCEXIT_SAMPLE—getting data from the data container.

FIG. 8 illustrates an exemplary implementation of method IF_TLM_OPERATION~IMPORT_CLIENTIND_DATA of class CL_TLM_CCEXIT_SAMPLE. User interface 800 includes area 802, area 804 and area 806. Area 802 allows a user to select methods of a particular class. The parameters associated with the method are displayed in area 704, and a code for the method is displayed in area 806. Area 802 displays package interfaces and embedded packages. Each embedded package includes package interfaces, dictionary objects, and class library. The class library comprises of multiple classes. Each class comprises of interfaces, attributes and methods. Parameters corresponding to the methods are displayed in area 804. Code of the selected method IF_TLM_OPERATION~IMPORT_CLIENTIND_DATA is displayed in area 806.

The method IF_TLM_OPERATION~IMPORT_CLIENTIND_DATA unpacks the data that was packed into the data container by the method IF_TLM_OPERATION~EXPORT_CLIENTIND_DATA.

An implementation of the method IF_TLM_OPERATION~EXPORT_CLIENTIND_DATA is shown below:

```
IF ir_data_container IS BOUND.
    CLEAR:
        lv_xstring,
        lv_returncode.
    CALL METHOD ir_data_container->get_data
        IMPORTING
            ev_container_data = lv_xstring
            ev_returncode = lv_returncode.
    IF lv_returncode = 0 OR lv_returncode = 4.
* 0 : data found in Data Container
* 4 : no data found in Data Container
        ev_returncode =
            IF_TENANTLM_C=>RETURNCODE_OK.
    ELSE.
* error reading Data Container
* write some error message to log
        ev_returncode =
            IF_TENANTLM_C=>RETURNCODE_ERROR.
    ENDIF.
ENDIF.
```

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    executing, by one or more processors of a multi-tenant computing system, an application in a first runtime environment of the multi-tenant computing system for at least one tenant, the application using tenant content associated with the at least one tenant;
    copying, using the one or more processors, the at least one tenant to a second runtime environment of the multi-tenant computing system according to a tenant copy procedure; and
    defining, using the one or more processors, a set of application exits for the tenant copy procedure, the set of application exits enabling detachment of the at least one tenant from the application during the copying, the application exits being defined:
        before deletion of the at least one tenant;
        after creation of the target tenant;
        before copying the at least one tenant to the target tenant;
        after copying the at least one tenant to the target tenant; and
        after copying tenant from the at least one tenant to the target tenant.

2. The computer-implemented method in accordance with claim 1, wherein the copying comprises:
    creating a target tenant;
    copying the at least one tenant to the target tenant, the copying comprising moving tenant content from the at least one tenant to the target tenant; and
    deleting the at least one tenant after the tenant content has been moved.

3. The computer-implemented method in accordance with claim 2, wherein:
    a first application exit is defined before the deletion of the at least one tenant, the first application exit executed to delete content associated with the at least one tenant;
    a second application exit is defined after the creation of the target tenant, the second application exit being executed to perform required actions;
    a third application exit is defined before the copying the at least one tenant to the target tenant, the third application exit being executed to store tenant-independent data in a data container;
    a fourth application exit is defined after the copying the at least one tenant to the target tenant, the fourth application exit being executed to extract the stored data in the stored container; and
    a fifth application exit is defined after the copying tenant from the at least one tenant to the target tenant, the fifth application exit being executed to perform data adjustment.

4. The computer-implemented method in accordance with claim 3, wherein each application exits is a software routine.

5. The computer-implemented method in accordance with claim 3, wherein the data container is exported from the source tenant to the target tenant.

6. A multi-tenant computing system comprising:
    a database storing system content associated with one or more applications of the multi-tenant computing system, and tenant content, a portion of the tenant content being unique to and associated with each tenant of the multi-tenant computing system for processing by the one or more applications; and
    one or more processors configured for:
        executing an application in a first runtime environment of the multi-tenant computing system for at least one tenant, the application using tenant content associated with the at least one tenant;
        copying the at least one tenant to a second runtime environment of the multi-tenant computing system according to a tenant copy procedure; and
        defining a set of application exits for the tenant copy procedure, the set of application exits enabling detachment of the at least one tenant from the application during the copying, the application exits being defined:
            before deletion of the at least one tenant;
            after creation of the target tenant;
            before copying the at least one tenant to the target tenant;
            after copying the at least one tenant to the target tenant; and
            after copying tenant from the at least one tenant to the target tenant.

7. The multi-tenant computing system in accordance with claim 6, wherein the copying comprises:
    creating a target tenant;
    copying the at least one tenant to the target tenant, the copying comprising moving tenant content from the at least one tenant to the target tenant; and
    deleting the at least one tenant after the tenant content has been moved.

8. The multi-tenant computing system in accordance with claim 7, wherein:
    a first application exit is defined before the deletion of the at least one tenant, the first application exit executed to delete content associated with the at least one tenant;
    a second application exit is defined after the creation of the target tenant, the second application exit being executed to perform required actions;

a third application exit is defined before the copying the at least one tenant to the target tenant, the third application exit being executed to store tenant-independent data in a data container;

a fourth application exit is defined after the copying the at least one tenant to the target tenant, the fourth application exit being executed to extract the stored data in the stored container; and a fifth application exit is defined after the copying tenant from the at least one tenant to the target tenant, the fifth application exit being executed to perform data adjustment.

9. The multi-tenant computing system in accordance with claim 8, wherein each application exits is a software routine.

10. The multi-tenant computing system in accordance with claim 8, wherein the data container is exported from the source tenant to the target tenant.

11. A computer-implemented method comprising:
providing a database for a multi-tenant computing system, the database storing system content associated with one or more applications of the multi-tenant computing system, and tenant content, a portion of the tenant content being unique to and associated with each tenant of the multi-tenant computing system for processing by the one or more applications;
executing, by one or more processors of the multi-tenant computing system, an application in a first runtime environment of the multi-tenant computing system for at least one tenant, the application using system content and tenant content associated with the at least one tenant;
copying, using the one or more processors, the at least one tenant to a second runtime environment of the multi-tenant computing system according to a tenant copy procedure; and
defining, using the one or more processors, a set of application exits for the tenant copy procedure, the set of application exits enabling detachment of the at least one tenant from the application and system content during the copying, the application exits being defined:
before deletion of the at least one tenant;
after creation of the target tenant;
before copying the at least one tenant to the target tenant;
after copying the at least one tenant to the target tenant; and
after copying tenant from the at least one tenant to the target tenant.

12. The computer-implemented method in accordance with claim 11, wherein the copying comprises:
creating a target tenant;
copying the at least one tenant to the target tenant, the copying comprising moving tenant content from the at least one tenant to the target tenant; and
deleting the at least one tenant after the tenant content has been moved.

13. The computer-implemented method in accordance with claim 11, wherein each of the application exits is a software routine.

14. The computer-implemented method in accordance with claim 12, further comprising storing tenant-independent data in a data container.

* * * * *